Sept. 27, 1960   F. GASCHE ET AL   2,954,041
HIGH PRESSURE INDICATOR AND RELIEF DEVICE
Filed Oct. 23, 1956
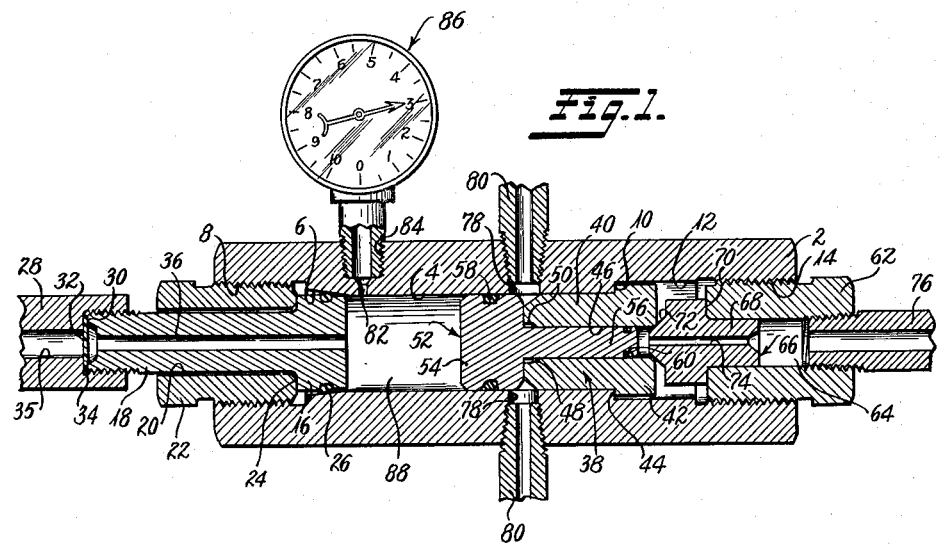
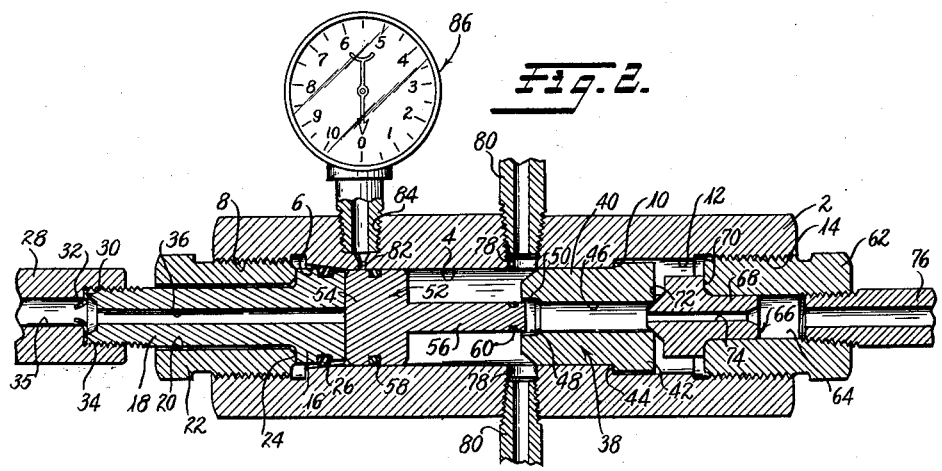
INVENTORS
Fred Gasche
Robert L. Porter
BY Bacon & Thomas
ATTORNEYS

United States Patent Office 2,954,041
Patented Sept. 27, 1960

2,954,041

HIGH PRESSURE INDICATOR AND RELIEF DEVICE

Fred Gasche and Robert L. Porter, Erie, Pa., assignors to Autoclave Engineers, Inc., Erie, Pa., a corporation of Illinois Filed Oct. 23, 1956, Ser. No. 617,782

1 Claim. (Cl. 137—70)

This invention relates to high pressure apparatus, and particularly to relief and indicating devices for controlling and indicating the values of high fluid pressures by means of relatively low pressure apparatus.

Extremely high fluid pressures are coming into increasing use and may reach values of 100,000 lbs. per sq. in. Control means for such unusually high pressures, such as indicating devices and pressure relief valves are difficult to obtain and in any event are very expensive. It is common in fluid installations to employ a frangible diaphragm exposed to the fluid pressure to rupture at a predetermined maximum value of that pressure to thereby vent the system. Such diaphragms, however, are not presently available in a form to resist the extremely high pressures with which applicant is concerned. However, the present invention permits use of available diaphragms designed to rupture at lower pressures for controlling the high pressures mentioned. Furthermore, gauges for indicating extremely high pressures are quite expensive and have short service lives, while gauges designed for relatively lower pressures are much less expensive and have materially longer service lives.

The invention relates to a device, subjected to the extremely high pressure to be controlled and/or measured and includes means arranged and designed to produce a proportional but lower pressure in a separate closed body of liquid and on which control functions are exercised, such as venting upon exceeding a certain predetermined pressure and on which the pressure measurements are made. In general, the invention comprises a compound piston and cylinder arrangement having a small diameter piston rigidly connected to a large diameter piston, each of which is axially slidably mounted in a corresponding cylinder. The smaller cylinder communicates with the high pressure system and the larger cylinder defines a closed chamber filled with liquid, such as oil or the like. The pressure applied to the closed body of liquid by the large piston thus bears a constant ratio to the high pressure system and that ratio is equal to the ratio of the areas of the pistons. The closed body of liquid is subjected to a control device operable to vent the large cylinder when the pressure therein exceeds a predetermined value and acts upon a suitable pressure gauge. Upon venting the body of liquid, the piston assembly moves under the influence of the high pressure in the small cylinder to uncover a relief port communicating with the small cylinder and thus vent the high pressure system.

It is therefore an object of this invention to provide apparatus for controlling extremely high pressures by providing a proportional but lower pressure in a closed body of liquid upon which control functions are performed.

It is another object of this invention to provide apparatus of the type described of extreme simplicity of construction and ease of assembly.

Still another object of this invention is to provide an apparatus as set forth hereinabove, adapted to use conventional and inexpensive control means which, in themselves, are not suitable for direct exposure to the high pressures ultimately controlled.

A further object is to provide apparatus as set forth above including novel relationships between the parts whereby an assembly of separate parts may be effectively sealed against high pressure leakage in a simple and efficient manner.

A still further object of the invention is to provide apparatus as described above, including novel means for providing cylinders of different diameters for a unitary compound piston to insure proper alignment thereof and means for sealing the cylinder and piston arrangement against high pressures.

Another further object of the invention is to provide apparatus as set forth above, including a novel high pressure venting arrangement.

An additional object is to provide apparatus of the type described, including a novel pressure indicating arrangement subjected only to relatively low pressure and arranged to prevent damage thereto upon venting or blow-off of the high pressure system.

Still further and additional objects and advantages will become apparent to those skilled in the art as the description proceeds in connection with the accompanying drawings, wherein:

Fig. 1 is a longitudinal sectional view through apparatus embodying the present invention with the parts in operative position; and Fig. 2 is a view similar to Fig. 1 but showing the parts in different relative positions.

The illustrated embodiment of the invention comprises a body member 2 having a cylindrical bore 4 therethrough. The bore 4 terminates at one end in an outwardly flared conical surface 6 which, in turn, communicates with an internally threaded counterbore 8. At its other end, the cylindrical bore 4 extends through a transverse surface defining an annular shoulder 10 which constitutes the bottom of a counterbore 12, the outer portion of which is internally threaded as at 14.

A closure member 16 is provided with a central neck 18 extending through an opening 20 in clamping nut 22 threaded in the counterbore 8 of the body. The closure 16 is provided with a transverse surface 24 against which the inner end of the clamping nut 22 abuts, as shown. The periphery of the closure 16 lies radially inwardly of the conical surface 6 and is provided with a peripheral groove constituting a seat for an O-ring seal 26 engaging the conical surface 6. The tapered surface 6 facilitates easy insertion of the closure 16 and O-ring 26, whereupon the clamping nut 22 may be advanced to urge the closure inwardly of the cylinder 4 and compress the O-ring against surface 6 to effect a tight and perfect seal. The outermost end of the neck portion 18 is externally threaded to receive a clamp fitting 28 and is provided with an end surface 30 defining an annular seat for a frangible or rupturable diaphragm 32. The fitting 28 is provided with a shoulder 34 acting to clamp the peripheral portion of the diaphragm 32 in sealing engagement against its seat 30. The fitting 28 is provided with a passageway 35 therethrough and may be connected to suitable piping (not shown) to conduct vented liquid to any desired remote position. The neck portion 18 of the closure 16 is provided with an axial passageway 36 providing communication between the inner surface of the diaphragm 32 and the interior of cylinder 4.

At the other end of cylinder 4, an adapter member 38 is provided with a cylindrical portion 40 extending into an end portion of the cylinder 4. The adapter 38 is also provided with an outer flange-like portion 42 defining an inwardly facing shoulder 44 abutting the annular shoulder 10 previously described. The adapter 38 is further provided with an internal axial cylindrical bore 46 terminating at its inward end in a conical surface 48 which, in turn, communicates with a counterbore 50.

A unitary compound piston device 52 is provided with a large piston portion 54 fitting the cylindrical bore 4 and a coaxial piston portion 56 fitting the cylindrical bore 46 in adapter 38. Both piston portions 54 and 56 are provided with peripheral O-ring seals 58 and 60, respectively. In manufacturing the parts, it is not necessary that the cylindrical portion 40 of the adapter 38 be of a size to exactly fit the cylinder 4 but may be made somewhat undersized. It is also not necessary that the cylinder 46 be exactly concentric to the outer surface of the cylindrical portion 40. By the construction shown, the adapter 38 may be moved laterally of its axis, within limits, to position the axis of the cylinder 46 therein in exact alignment with the axis of cylinder 4, or at least in exact alignment with the axis of piston 56. Thus, the parts may be assembled and adjusted to provide for free sliding movement of the piston assembly in the aligned cylinders 4 and 46 without necessitating extremely high precision machining operations to initially form the components exactly concentric and aligned.

A fitting 62 is threaded into the threaded counterbore 12 and is provided with a relatively large central passageway 64 therethrough. A plug member 66 is formed with an external conical surface 72 extending into the outer end of cylindrical bore 46 in adapter 38. The plug 66 is also provided with a boss 68 nesting in the passageway 64, an enlargement having a shoulder 70 abutting the inner end of fitting 62, and an axial passageway 74 therethrough. Suitable piping 76 is connected to the fitting 62 to provide communication with the high pressure fluid system being controlled.

After assembly of the adapter 38 and piston structure 52 in the body 2, as previously described, the plug 66 and fitting 62 may be inserted and the plug threadedly advanced to firmly seat the conical surface 72 against the periphery of the cylinder 46 to thus seal that connection and clamp surface 44 against shoulder 10 in engagement with and in properly aligned relation to the piston 52. The passageways 64 and 74 constitute a conduit means for conducting high pressure fluid from the system being controlled to the interior of the cylinder 46.

The body member 2 is further provided with transverse openings 78 communicating with the cylindrical bore 4 adjacent the inner end of adapter 38, and suitable piping 80 is connected to the body as shown to provide communication between the openings 78 and any desired remote station for disposal of vented high pressure fluid, as will be described.

The body 2 is provided with a further transverse port 82 communicating with cylindrical bore 4 adjacent the closure 16. The body is also provided with a threaded counterbore 84 receiving a suitable fluid pressure indicating device 86.

Assuming, for purpose of illustration, that the piping 76 is connected to a high pressure fluid system, that pressure fluid acts on the outer end of small piston 56 tending to move the same to the left of the position it occupies in Fig. 1. In use, however, the space between large piston 54 and closure 16 (defining chamber 88) is completely filled with a substantially incompressible liquid such as oil, water or the like, and since the chamber 88 is closed and sealed by frangible diaphragm 32 and the pressure indicator 86, the piston assembly cannot move to the left even under the influence of the high pressure fluid acting against the small piston. Further assume, merely for purpose of illustration, that the unit pressure in the high pressure system is 100,000 lbs per sq. in., then the total pressure exerted thereby against the end of the small piston 56 is distributed over the entire face area of the large piston 54 and applied to the liquid in chamber 88. Assuming the ratio of the cross-sectional areas of pistons 54 and 56 to be 10-to-1, then the unit pressure applied to the liquid in chamber 88 is 1/10 of the pressure in the high pressure system, or 10,000 lbs. per sq. in. The unit pressure in chamber 88 thus always bears a constant relationship to the pressure in the high pressure system.

The pressure indicator 86 responds to pressure changes in chamber 88 and indicates those pressures directly. The device may be calibrated to read in terms of the pressure in the high pressure system since it is always directly proportional to that in chamber 88.

In the case assumed, the frankible diaphragm 32 is constructed and designed to resist unit pressures up to 10,000 lbs. per sq. in. and to rupture, as shown in Fig. 2, when the unit pressure thereagainst exceeds that value.

Now assume that the unit pressure in the high pressure system exceeds 100,000 lbs. per sq. in. The initial result of the increase in pressure in the rupturing of the diaphragm 32 and venting of chamber 88 through passageway 35. When that occurs, the high pressure acting against the end of the small piston 56 causes the piston assembly to move to the left to expel the liquid from chamber 88.

It is to be noted that the port 82 is located adjacent the closure 16. The location of the port 82 is such that when the piston reaches the position of Fig. 2, the O-ring seal 58 isolates the port 82 from the high pressure system. During expulsion of liquid from the chamber 88, a substantial pressure is maintained thereon until the liquid is all expelled. That pressure is reduced relatively gradually and by the time the piston 54 approaches the position of Fig. 2 its periphery substantially closes the port 82 to thus prevent a sudden drop in the pressure acting on the parts of the pressure gauge to thus protect those parts against sudden shocks and possible damage, which shocks would be occasioned by an instantaneous drop in the pressure applied to the gauge.

The parts are so proportioned and dimensioned that, as the piston assembly approaches the position of Fig. 2, the small piston 56 moves completely out of the small cylindrical bore 46 to thus vent the small cylinder to the large cylindrical bore 4 and thence through passageways 78 and piping 80 to a remote position where the high pressure fluid may be safely disposed of. The vent passageways 78 communicate with the cylindrical bore 4 rather than communicating directly with the small cylindrical bore 46, to facilitate construction and assembly of the parts. When constructed in the manner disclosed, no provision need be made for the alignment of transverse ports or passageways between the body 2 and the adapter 38 and thus the parts may be more economically produced and more readily assembled.

Obviously the conical surface 48 and counterbore 50 facilitate resetting the device after blow-off, in an obvious manner.

While a single specific embodiment of the invention is shown and described herein, it is to be understood that the same is merely illustrative and that the invention is not limited thereto. It is contemplated that the invention encompass all modifications falling fairly within the scope of the appended claim.

We claim:

In a fluid pressure-responsive device, a body having a first cylindrical bore therein, a cylindrical fitting in said bore having a axial second bore therethrough, a unitary piston having a large diameter portion fitting said first cylindrical bore and a small diameter portion fitting said second bore, a closure for said first cylindrical bore and defining a closed chamber with said large piston means defining a passageway for conducting high pressure fluid to the outer end of said second bore, said body being provided with a transverse shoulder around one end of said first cylindrical bore and said fitting being provided with a flange-like portion having a surface abutting said shoulder, said last-named means comprising a member having a conical portion extending into an end of said second bore, and means urging said member axially to seal said conical portion around the periphery of said second bore and to press said surface against said shoulder, an outlet communicating with said first cylindrical bore adjacent said cylindrical fitting, and means for establishing communication between the inner end of said second bore and said outlet when said piston is adjacent said closure.

References Cited in the file of this patent

UNITED STATES PATENTS

| | | |
|---|---|---|
| 841,972 | Huber | Jan. 22, 1907 |
| 1,246,542 | Cantrell | Nov. 13, 1917 |
| 1,822,628 | Lincoln | Sept. 8, 1931 |
| 1,888,990 | Kurath | Nov. 29, 1932 |
| 1,911,918 | Miller et al. | May 30, 1933 |
| 2,303,590 | Towler et al. | Dec. 1, 1942 |
| 2,517,061 | Von Stackelberg | Aug. 1, 1950 |
| 2,621,885 | Schmitt | Dec. 16, 1952 |
| 2,707,479 | Thomann et al. | May 3, 1955 |
| 2,710,014 | Hayes | June 7, 1955 |
| 2,712,458 | Lipson | July 5, 1955 |
| 2,748,947 | Jay | June 5, 1956 |
| 2,757,966 | Samiran | Aug. 7, 1956 |
| 2,827,766 | Hufford | Mar. 25, 1958 |